J. ANDREWS.
Hold-Back.
No. 128.  
Patented Feb. 16, 1837
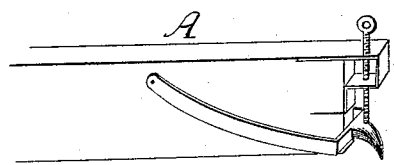
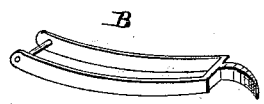
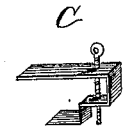
Attest.  
Edw Curtis  
C. R. Porter
Inventor  
James Andrews

UNITED STATES PATENT OFFICE.

JAMES ANDREWS, OF CAMDEN, MAINE.

HOLDBACK FOR SLEDS.

Specification of Letters Patent No. 128, dated February 16, 1837.

*To all whom it may concern:*

Be it known that I, JAMES ANDREWS, of Camden, in the county of Waldo and State of Maine, have invented a new Mode of Holding Back Sleds on Icy Descents or Hills; and I do hereby declare that the following is a full and exact description.

There is a flat bar of iron fastened firm on the top of the runner extending about ten inches on said runner from its hinder part. It thence extends beyond the hinder part of the runner about two inches and one half of an inch. It then descends perpendicularly two inches and one half of an inch. It then turns at right angles and goes two inches and one half of an inch to the hinder part of the runner. It then passes down by the end of the runner to the shoe and then passes in between the shoe and runner about ten inches through that part which projects beyond the hinder part of the runner on top and consequently through that part which is directly under it, there are holes made and prepared as nuts (so that in fact they are double nuts) and a screw is fitted to these nuts and is so long as to project up above the top of the sled; and on the top of the screw there is a hole to admit a rod through it for the purpose of turning the screw. There is then an iron, in the form of a hook or a section of a hook and of sufficient thickness to resist the weight of the sled, extending beyond the end of the runner about four inches onto which the screw aforesaid descends, and in order to give this iron its requisite play and at the same time to make it secure, it branches into two arms, one on each side of the runner and at about eighteen inches from the hinder part or end of the runner and about midway of the runner in height or near the top it is secured by a bolt which passes through both arms at the ends thereof and through the runner and is secured or fastened by a nut. This iron, when the screw is not upon it, will play up and down, and will not impede the sled perceptibly in its progress or when the sled is used on level roads or at times when it is not icy or very slippery this iron can in a moment or two be taken off.

When the time arrives for its use—say on the top of a hill—the teamster will pass his goad stick through the aperture of the screw and cause it to revolve until it has pressed the last described iron or hold back firmly onto the ice or snow, and then the oxen or other cattle fastened to the sled may safely go down the steepest icy hill with safety, even with a great load. As soon as the sled is safely down the screw may be revolved back and that part of the hold back which has the hook may be permitted to play on the snow or ice or may as aforesaid easily be removed. This hook has its concave or hollow next toward the ground.

What I claim as my invention and desire to secure by Letters Patent, is—

The whole of the aforesaid iron fastened and used as aforesaid and which I call a hold back. I refer to the drawings.

JAMES ANDREWS.

Witnesses:
J. C. STETSON,
C. R. PORTER.